US005206679A

United States Patent [19]

Tahara et al.

[11] Patent Number: 5,206,679

[45] Date of Patent: Apr. 27, 1993

[54] METHOD OF AND APPARATUS FOR CUTTING SHEET-MATERIAL

[75] Inventors: Syuji Tahara; Hiroyuki Satou; Norio Ookawa, all of Kanagawa, Japan

[73] Assignee: Fuji Photo Film Co., Ltd., Kanagawa, Japan

[21] Appl. No.: 747,485

[22] Filed: Aug. 19, 1991

Related U.S. Application Data

[60] Continuation of Ser. No. 509,837, Apr. 17, 1990, abandoned, which is a division of Ser. No. 292,801, Jan. 3, 1989, abandoned.

[30] Foreign Application Priority Data

Jan. 19, 1988 [JP] Japan .................................... 63-9147
Jan. 20, 1988 [JP] Japan .............................. 63-5622[U]
Jan. 20, 1988 [JP] Japan .................................. 63-10377

[51] Int. Cl.[5] ......................... B26D 5/20; G03B 29/00

[52] U.S. Cl. ........................................ 355/29; 83/145; 83/238; 83/250; 83/628; 355/74

[58] Field of Search ................... 83/42, 203, 238, 240, 83/241, 242, 250, 251, 613, 628, 145, 282, 111, 451, 466.1; 355/28, 29, 74

[56] References Cited

U.S. PATENT DOCUMENTS 1,594,696 8/1926 Rose ...................................... 83/145
2,379,682 7/1945 Colucci et al. ......................... 83/145
3,199,389 8/1965 Cone ....................................... 83/145
3,376,775 4/1968 Eliason .................................. 83/582
4,157,221 6/1979 Rauen .................................... 355/29
4,193,329 3/1980 Strune ................................. 83/111 X
4,604,929 8/1986 Vallance ........................... 83/628 X
4,655,583 4/1987 Kitai et al. ............................. 355/29

*Primary Examiner*—Eugenia Jones
*Attorney, Agent, or Firm*—Sughrue, Mion, Zinn, Macpeak & Seas

[57] ABSTRACT

A method of cutting a fed sheet-material into a cut segment and a remaining portion by engaging a movable cutting edge with a fixed cutting edge is disclosed, wherein the remaining portion after being cut off is fed in a spacing with a predetermined amount of insertion between the fixed and movable cutting edges. The top of remaining portion can therefore be prevented from being curled down forward in the moving direction of the movable and fixed cutting edges. An apparatus for cutting a fed sheet-material into a cut segment and a remaining portion by engaging a movable cutting edge with a fixed cutting edge is also disclosed, wherein a plate member incorporated therein hinders the movement of the top of remaining portion after being cut off together with the movable cutting edge. Hence, the top of remaining portion can be prevented from being turned up by the movable cutting edge.

11 Claims, 4 Drawing Sheets

METHOD OF AND APPARATUS FOR CUTTING SHEET-MATERIAL

This is a continuation of application Ser. No. 07/509,837 filed Apr. 17, 1990, now abandoned, which is a divisional of application Ser. No. 07/292,801 filed Jan. 3, 1989, now abandoned.

BACKGROUND OF THE INVENTION

1. Field of the Invention

The present invention is generally directed to a method of and an apparatus for cutting a web or a sheet-material, and more particularly, to a method of and apparatus for sequentially cutting such a thin and lengthy material into a sheet of photographic printing paper or the like.

2. Description of the Prior Art

After an image has been printed by beams of printing light emerging from a light source in a printer, a thin and lengthy material (hereinafter referred to as a sheet-material) like printing paper on which images are formed is cut off for every image.

A process of cutting the sheet-material typically involves the use of a sheet-material cutting apparatus (a sheet cutter) equipped with a fixed cutting edge fixed to a frame and a movable cutting edge engaged with the former. More specifically, the sheet-material is fed in a spacing between the opposed fixed and movable cutting edges. The movable cutting edge engages with the fixed cutting edge to produce a shearing force by which the sheet-material is cut into a cut segment and a remaining portion. The sheet material is consecutively cut off to predetermined lengths by the above-mentioned method of and apparatus for cutting the sheet material.

There arise, however some problems inherent in the foregoing conventional sheet-material cutting method. For instance, if the remaining portion is left for a relatively long time after cutting the sheet-material, the remaining portion of the sheet-material near the top thereof is curled down. As a result, the top of the sheet-material is caught by the fixed cutting edge when cutting the paper once again. For this reason, the remaining portion of sheet-material is not smoothly fed in the spacing between the fixed and movable cutting edges opposite to each other, thereby causing a blockade, i.e., a so-called jam of the sheet-material.

The conventional sheet-material cutting apparatus has an additional problem in which as the movable cutting edge moves (in such a direction as to separate from the fixed cutting edge) after cutting the sheet-material, the top of remaining portion thereof tends to contact the movable cutting edge, with the result that the top portion is raised and turned up by a frictional force caused therebetween. Such being the case, when cutting the sheet-material next time, the remaining portion of sheet-material encounters the difficulty of entering the spacing between the fixed and movable cutting edges. In consequence, there is caused a problem of creating the blockade, viz., the jam of the sheet-material.

To cope with this, the spacing between the fixed cutting edge and the movable cutting edge is widened. This simple arrangement in turn leads to a reduction in cutting velocity because of a larger amount of movement of the movable cutting edge, or to an increase in force required for driving the movable cutting edge.

Where the movable cutting edge serves as one side of a printing frame (easel) suited to print an image on the printing paper, a guide such as a plate for holding the sheet-material can not be disposed just in front of the movable cutting edge, i.e., on the up-stream side of a direction in which the sheet-material is carried.

BRIEF SUMMARY OF THE INVENTION

It is a primary object of the present invention which has been inspired by such circumstances to provide a sheet-material cutting method and apparatus, both of which are capable of preventing the occurrence of a blockade, i.e., a so-called jam of the sheet-material owing to the arrangement that when cutting the sheet-material, for instance photographic printing paper or the like, a remaining portion of the sheet-material can smoothly be fed in a spacing formed between opposed fixed and movable cutting edges.

To this end, according to one aspect of the invention, there is provided a sheet-material cutting method comprising the steps of; disposing a fixed cutting edge and a movable cutting edge opposite each other to make a relative movement; engaging the movable cutting edge with the fixed cutting edge to produce a shearing force; and sequentially cutting the sheet-material by the shearing force into a cut segment and a remaining portion, whereby the remaining portion of the sheet-material is slightly shifted in the same direction as that in which the sheet-material is carried after cutting the sheet-material, and is then brought into a standby state for the next process of cutting the sheet-material.

Based on the thus arranged sheet-material cutting method, the sheet-material is fed in a spacing between the fixed and movable cutting edges. After feeding the sheet-material therein, the movable cutting edge moves and engages with the fixed cutting edge to produce a shearing force by which the sheet-material is cut into a cut segment and a remaining portion.

After engaging the cutting edges with each other, viz., cutting the sheet-material, the movable cutting edge resumes its movement to disengage from the fixed cutting edge. After the movable cutting edge has separated therefrom, the remaining portion is caused to make a slight movement in the same direction as that in which the sheet-material is carried and is then brought into a standby state for the next process of cutting the sheet-material.

Therefore, after the movable cutting edge has separated from the fixed cutting edge, i.e., the sheet-material has been cut off, even if the remaining portion of sheet-material is curled, the top thereof is invariable disposed in the spacing between the fixed and movable cutting edges standing vis-à-vis with each other.

As a result, in the next cutting process the remaining portion of sheet-material can be fed in the spacing formed between the fixed and movable cutting edges, thereby causing no blockade or jam of the sheet-material.

According to another aspect of the invention, there is provided an apparatus for cutting a sheet-material, comprising: a fixed cutting edge; and a movable cutting edge disposed vis-àvis with the fixed cutting edge, the movable cutting edge making a relative movement and engaging with the fixed cutting edge to produce a shearing force by which the sheet-material to be carried is cut into a cut segment and a remaining portion, characterized by a movement hindering member, provided on the up-stream side of a direction in which the sheet-material is carried with respect to the movable cutting edge, for hindering the movement in the same direction as that in which the movable cutting edge moves by pressing down the top of remaining portion of the sheet-material.

In the thus constructed sheet-material cutting apparatus, the sheet-material is fed in a spacing formed between the fixed and movable cutting edges. After the sheet-material has been fed therein, the movable cutting edge engages with the fixed cutting edge to create the shearing force whereby the sheet-material is cut into the cut segment and the remaining portion.

After engaging the cutting edges with each other, viz., cutting the sheet-material, the movable cutting edge resumes its movement to disengage therefrom. In this case, as the movable cutting edge moves, the top of remaining portion of the sheet-material is raised by a frictional force caused between the movable cutting edge and the top portion itself and tends to move in such a direction as to separate from the fixed cutting edge. However, the movement hindering member disposed on the up-stream side of the sheet-material carrying direction with respect to the movable cutting edge functions to make the top of remaining portion of the sheet-material follow the movable cutting edge while being pressed down by the hindering member, thus hindering the top portion from being turned up.

The top of remaining portion is never turned up even after cutting the sheet-material and is therefore positioned invariable in the spacing between the fixed and movable cutting edges. Accordingly, the remaining portion of sheet-material can smoothly be fed in the spacing between the fixed and movable cutting edges in the next cutting process also, whereby no blockade or jam of the sheet-material is caused.

BRIEF DESCRIPTION OF THE DRAWINGS

Other objects and advantages of the invention will become more apparent during the following discussion in conjunction with the accompanying drawings, in which.

DETAILED DESCRIPTION OF THE PREFERRED EMBODIMENT

Figure 1:
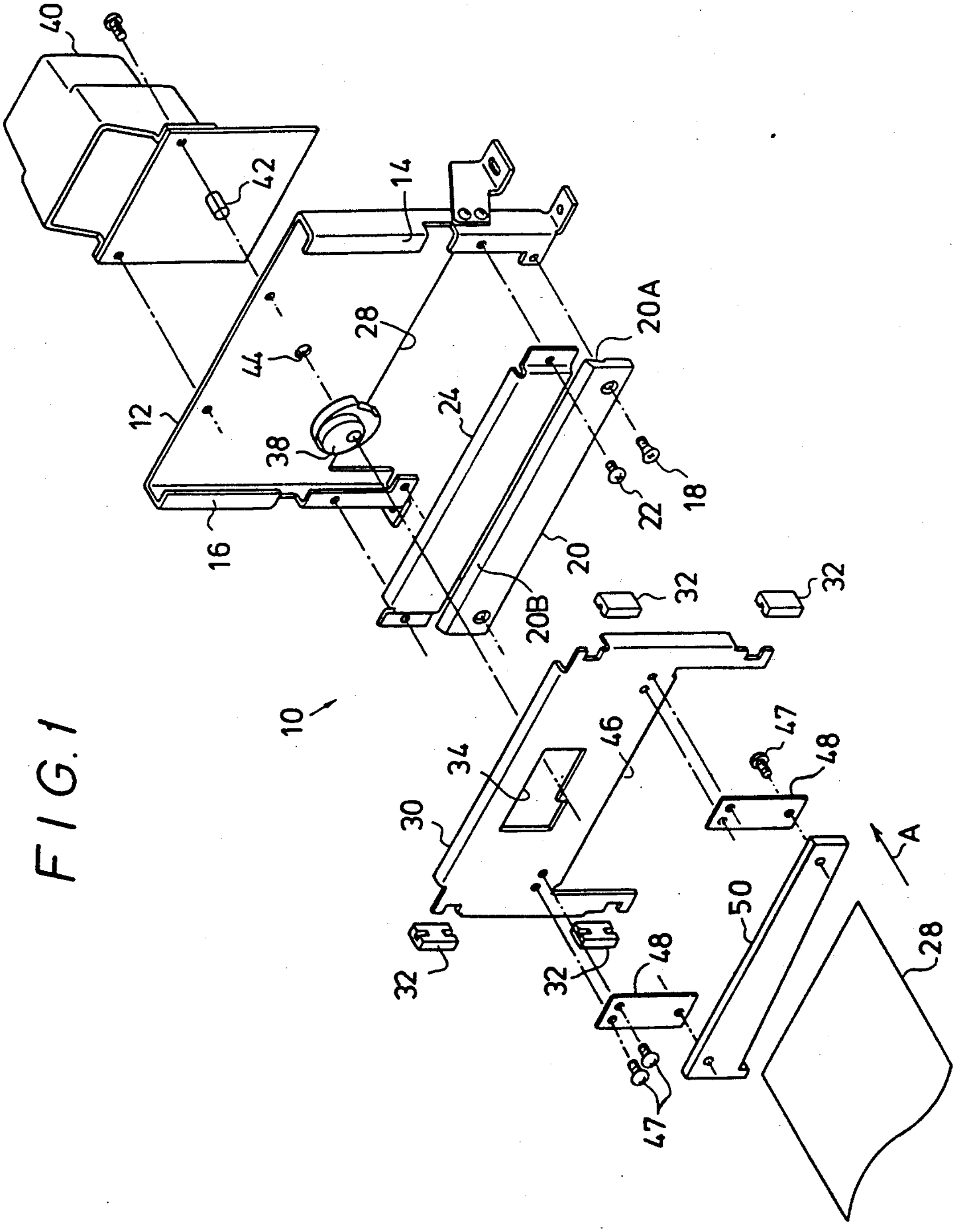
FIG. 1 is an exploded perspective view illustrating a photo printing easel to which a method of and apparatus for cutting a photographic sheet-material according to the present invention are applied.

Turning first to FIG. 1, there is illustrated an exploded perspective view of a photo printing easel 10 to which a method of and apparatus for cutting a photographic sheet-material according to the present invention are applied. Photo printing easel 10 includes a fixed bracket 12 formed of a relatively thick steel plate. Both ends of bracket 12 are provided with guide arms 14 and 16 each assuming a U-like configuration, these arms 14 and 16 being formed opposing each other in the up-and-down direction. Secured through screws 18 to the lower portions of guide arms 14 and 16 is a fixed cutting edge 20 formed with an edge surface 20A and an oblique surface 20B each assuming a trapezoidal shape in section. Edge surface 20A is set on the rear side (the inner side of FIG. 1), while oblique surface 20B is set upward.

Figure 2:
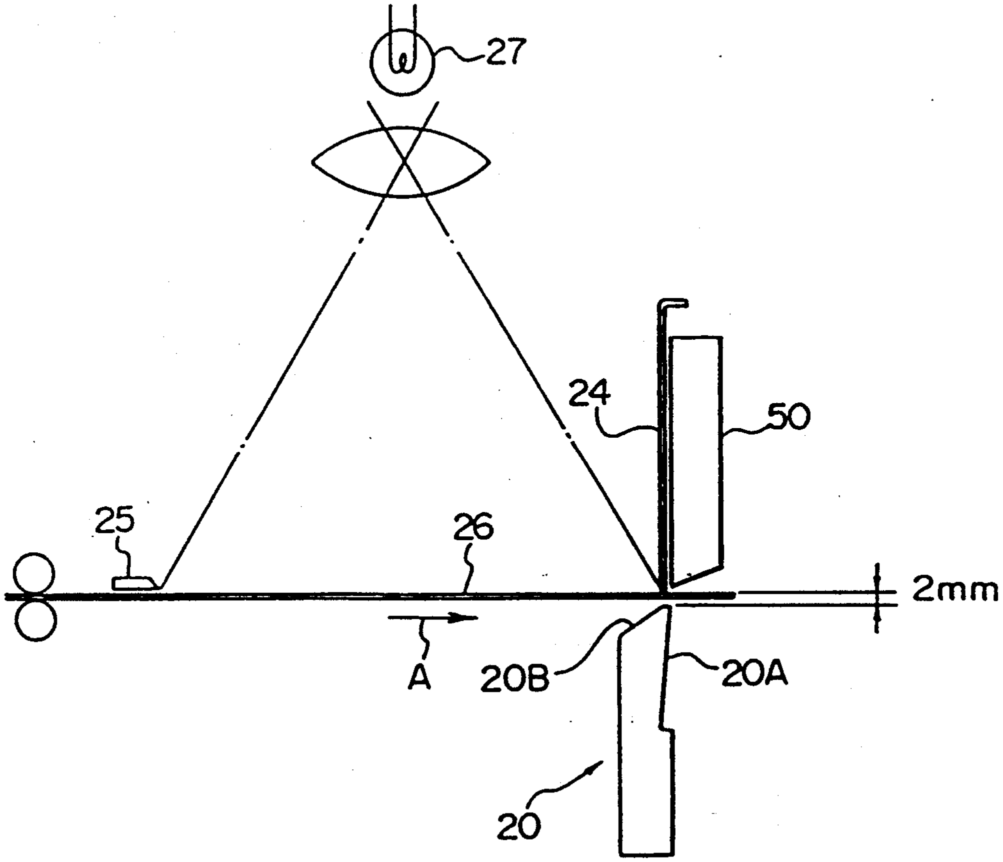
FIG. 2 is a sectional view schematically showing a corresponding relation between a movable cutting edge, a fixed cutting edge and a sheet of printing paper.
Figure 3A:
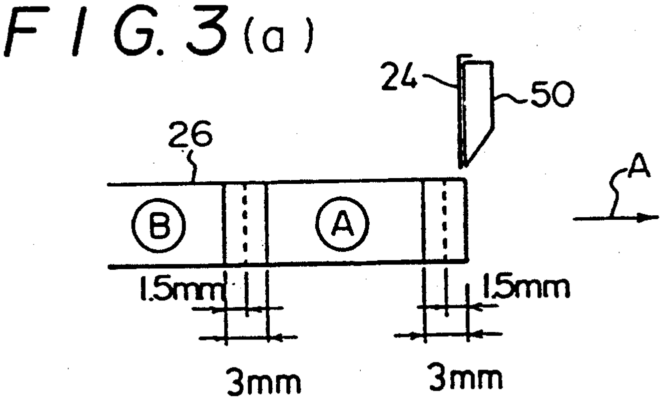
FIGS. 3(*a*) through 3(*e*) are view each schematically showing the corresponding relation between the movable cutting edge and the printing paper in the cutting process.
Figure 3B:
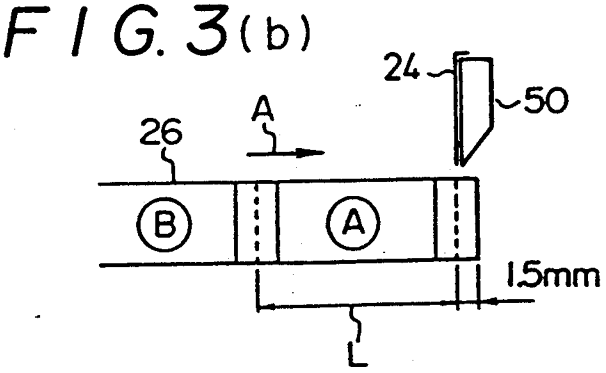
Figure 3C:
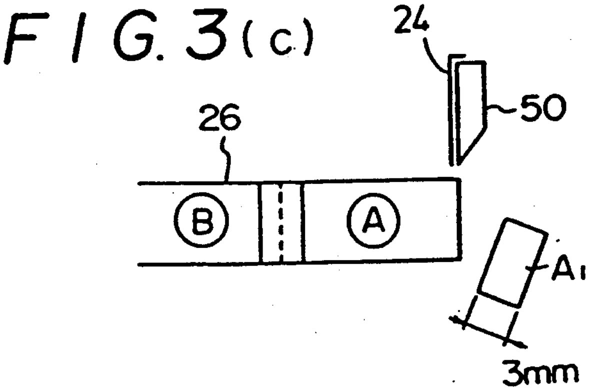
Figure 3D:
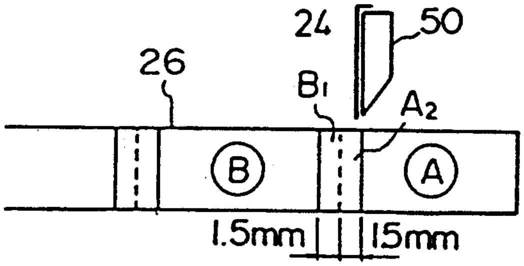
Figure 3E:
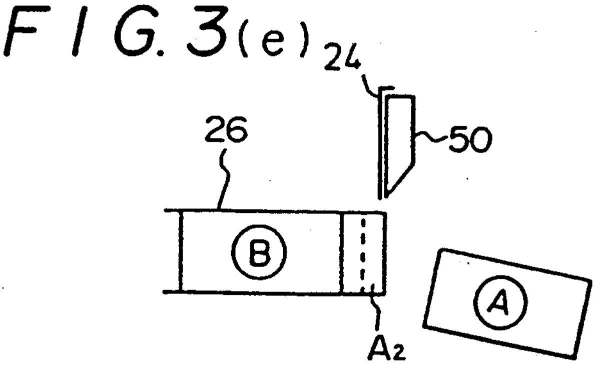

Just above fixed cutting edge 20 (i.e., on the side of an image printing surface of a sheet of printing paper 26), a fixed plate 24 serving as a movement hindering member is fastened with screws 22. Fixed plate 24 is, as illustrated in FIG. 2, is mounted providing a spacing of 2 mm from the upper end of fixed cutting edge 20. Printing paper 26 conceived as a lengthy sheet-material and fed by a pair of rollers 29 is fed in the spacing formed therebetween. Fixed plate 24 cooperates with a movable mask 25 (see FIG. 2) to exhibit a flare preventing function when printing images, and are also combined to constitute a printing frame (easel). In the image-printing process, beams of printing light emitted from a light source 27 are shut off by fixed plate 24, thus printing the image.

Fixed bracket 12 corresponding to fixed cutting edge 20 is formed with a rectangular notch 28 serving as a passage portion for admitting a passage of printing paper 26 which passes through edge surface 20A of fixed cutting edge 20 after being carried from a direction indicated by an arrow A of FIG. 1.

A movable mount 30 is slidably attached to the inner parts of guide arms 14 and 16, the movable mount being raised and lowered while being guided by these guide arms.

As in fixed bracket 12, movable mount 30 is formed of a relatively thick steel plate. Fixed to the upper and lower portions of both ends of movable mount 30 are block-like shoes 32 having their sizes suited to enter guide arms 14 and 16. Shoes 32 perform a function to guide movable mount 30 while sliding on the insides of guide arms 14 and 16.

Formed in a substantially central portion of movable mount 30 is a slot 34 extending in the direction orthogonal to the direction in which movable mount 30 moves. Inserted into slot 34 is a disk cam 38 fixed to a rotary shaft 42 of a motor 40.

Motor 40 is mounted on the rear surface of fixed bracket 12. Rotary shaft 42 passes through a circular hole 44 bored in fixed bracket 12, the axial core of disk cam 38 is fixed to the tip of rotary shaft 42. With this arrangement, disk cam 38 rotates with revolutions of motor 40, and movable mount 30 is moved up and down through slot 34 with respect to fixed bracket 12.

A notch 46 is formed in the lower portion of movable mount 30. Movable cutting edge 50 is disposed in notch 46 through plate springs 48 fastened with screws 47, the movable cutting edge being secured so that its edge line is set at a predetermined oblique angle inclined to the edge line of fixed cutting edge 20. Hence, movable cutting edge 50 is positioned on the side of fixed plate 24 opposite to the printing unit. Movable cutting edge 50 moves together with movable mount 30 in the up-and-down direction. In its descent position movable cutting edge 50 engages with fixed cutting edge 20 fixed to bracket 12.

At the top dead center the largest portion of the edge line of movable cutting edge 50 is so set as to be flush with or slightly higher than the lower end of fixed plate 24.

In this embodiment, a spacing between movable cutting edge 50 and fixed plate 24 is set to 0.5 mm. Hence, the beams of printing light emerging from the light source are shut off by fixed plate 24 when printing the images, with the result that the light is never reflected by movable cutting edge 50.

Note that the adjacent images printed on printing paper 26 are spaced typically 2 to 3 mm away from each other, and in this embodiment the spacing is set to 3 mm.

The description will next deal with the function of this embodiment.

In the case of printing the images on printing paper 26, the beams of printing light emitted from the light source 27 are shut off by fixed plate 24 and movable mask 25 which are combined to constitute the printing frame (easel), thus printing the images. Since the tip of movable cutting edge 50 is disposed much higher than the lower end of fixed plate 24, there is no probability that the movable cutting edge is irradiated with the printing light to cause the reflection therefrom. Thus, no flare is created in the printed images. In this case, the prevention of flare can be attained more effectively if the fixed plate 24 is colored in black.

Printing paper 26 on which the image has been printed is fed to photo printing easel 10 in the direction indicated by arrow A of FIG. 1, and is further fed in the spacing between fixed and movable cutting edges 20 and 50 standing vis-à-vis with each other. When printing paper 26 comes to a predetermined position, a cut process signal to cut printing paper 26 is transmitted from an unillustrated control circuit to motor 40, and the motor is thereby rotated. When disk cam 38 rotates with the revolutions of motor 40, movable mount 30 is lowered through slot 34. Then, the tip of movable cutting edge 50 engages with edge surface 20A of fixed cutting edge 20, thus initiating the cutting of printing paper 26.

When motor 40 further rotates, movable cutting edge 50 completely cuts printing paper 26. After reaching the bottom dead center, the movable cutting edge resumes its ascent. At the top dead center the supply of electricity to motor 40 is stopped, and simultaneously movable cutting edge 50 also halts at the top dead center.

After movable cutting edge 50 has engaged with fixed cutting edge 20, i.e., printing paper 26 has been cut off, the movable cutting edge moves against to disengage from fixed cutting edge 20. At this time, the top of remaining portion of printing paper 26 tends to shift together with movable cutting edge 50 in such a direction to separate from fixed cutting edge 20 by dint of a frictional force. However, the top of remaining portion of printing paper 26 follows movabie cutting edge 50 while being pressed down by fixed plate provided on the up-stream side of the direction in which printing paper 26 is carried with respect to movable cutting edge 50, thereby hindering the turn-up of the top portion thereof.

As a result, the top of remaining portion of printing paper 26 is by no means turned up even after cutting the printing paper, and is invariably positioned in the spacing between fixed cutting edge 20 and movable cutting edge 50. Consequently, even when consecutively cutting printing paper 26 at a high velocity, the remaining portion of printing paper 26 can smoothly be fed in the spacing between fixed cutting edge 20 and movable cutting edge 50, thereby eliminating the possibility of causing the blockade, viz., the jam of printing paper 26.

Thus, after movable cutting edge 50 has ceased to move in the position of top dead center, the remaining portion of printing paper 26 makes a predetermined amount of movement in the same direction (indicated by arrow A of FIG. 1) as that in which printing paper 26 is carried, and is brought into a standby state for the next process of cutting the sheet-material. Referring now to FIGS. 3(*a*) through 3(*e*), there is each shown a corresponding relation between movable cutting edge 50 and printing paper 26 in that instance. Note that there is exemplified a case of obtaining a borderless print produced by cutting both ends of the printed image to predetermined widths (1.5 mm in this example).

Such a process will bee explained more specifically. As illustrated in FIG. 3(*a*), after engaging fixed movable cutting edge 50 with fixed cutting edge 20, i.e., cutting printing paper 26, the paper is fed in so that fixed plate 24, as depicted in FIG. 3(*b*), enters half a spacing between the images. Namely, printing paper 26 is fed in at a distance of 1.0 mm, because the spacing between fixed plate 24 and movable cutting edge 50 is set to 0.5 mm. Then, the printing paper 26 comes into the standby state for the next printing process, in which state an image A is printed. A printing length is designated by L in this case.

Subsequently, as illustrated in FIG. 3(*a*), printing paper 26 continues to be fed in (viz., at a distance of 2 mm) till the edge line of movable cutting edge 50 is aligned with the front end of image A; and a printing end $A_1$ of image A is cut off by a width of 3 mm.

Referring to FIG. 3(*b*), in the printing standby state, the top of remaining portion of printing paper 26 is positioned in the spacing between fixed cutting edge 20 and movable cutting edge 50 (in other words, the paper top is protruded 1.0 mm therefrom), and the remaining portion thereof is left to stand as it is for a relatively long time. Thereafter, when cutting the paper once again, or even when cutting the paper while a wind-up curl of rolled printing paper 26 remains uneliminated, the remaining portion of printing paper 26 can smoothly be fed in the spacing between fixed cutting edge 20 and movable cutting edge 50. In the case of consecutively cutting printing paper 26 at a high velocity, no blockade, viz., jam of printing paper 26 is caused.

Based on the conventional method, the spacing between fixed cutting edge and movable cutting edge positioned at the top dead center is required to be widened in order to prevent the generation of jam. This arrangement results in a delay of cutting speed due to an increase in amount of necessary movement of the movable cutting edge. In addition, a large driving force is required for moving the movable cutting edge, i.e., the movable mount. In accordance with this embodiment, however, the spacing between fixed cutting edge 20 and movable cutting edge 50 positioned at the top dead center is set to 2 mm or somewhat more. Hence, the amount of necessary movement of movable cutting edge 50 is considerably less than in the prior art, thereby making it possible to cut the paper at a higher velocity. Moreover, the force for driving movable cutting edge 50, viz., movable mount 30 may be small.

In the wake of the above-described step, as depicted in FIG. 3(*d*), the edge line of movable cutting edge 50 is shifted till the edge line is aligned with the position closer than the rear end portion of image A by a width (1.5 mm) of a rear printing end $A_2$ on this side. Then, image a is, as illustrated in FIG. 3(*e*), cut off.

Printing paper 26 is, as in the previous process, fed in half a spacing between the images, i.e., at a distance of 1.0 mm, and is brought into the same standby state (as that depicted in FIG. 3(*b*)) for the next printing process of printing paper 26. In this state, an image B is printed in the same manner as that in image A.

It is to be noted that in this embodiment the amount of feed of printing paper 26 after reaching the top dead center at which the movable cutting edge 50 engages with fixed cutting edge 20 is set to 1.0 mm. The amount of feed is not confined to this value, but may be variable. One permissible arrangement is that printing paper 26, which has temporarily been fed in, may be in turn fed back when printing the image.

Although the illustrative embodiment of the present invention has been described in greater detail with reference to the accompanying drawings, it is to be noted that the invention is not limited to the precise embodiment. Various changes or modifications may be effected therein by one skilled in the art without departing from the scope of spirit of the invention.

What is claimed is:

1. A sheet-material cutting apparatus for cutting a fed long photographic sheet-material into a plurality of frames to be printed, said apparatus being provided in the vicinity of an outlet of a photographic printer from which said photographic sheet-material is discharged for cutting by said cutting apparatus, said apparatus comprising:

- a fixed cutting edge;
- a movable cutting edge disposed opposite said fixed cutting edge and moved in a first direction to engage said fixed cutting edge, causing a shearing force by which said sheet-material is cut into a cut segment and a remaining portion, said movable cutting edge being subsequently moved in a second direction opposite to said first direction to disengage from said fixed cutting edge;
- a movement preventing means, comprising:
  - a plate member, disposed up-stream of a direction in which said sheet-material is carried with respect to said movable cutting edge, for preventing the end of said remaining portion from moving in said second direction by a lower horizontal end portion of said plate member when said movable cutting edge moves in said second direction; and
  - a fixed bracket, cooperating with said fixed cutting edge, said plate member being disposed below said movable cutting edge when said movable cutting edge is at a top dead center of its movement;
- said sheet-material cutting apparatus further comprising a movable mask disposed up-stream from said plate member, cooperating with said plate member in constituting a printing frame defining an image size of each of said plurality of frames to be printed, said printing frame exhibiting a flare preventing function when images are printed on said photographic sheet material.

2. An apparatus as set forth in claim 1, wherein said plate member has an opposing side substantially parallel to an edge line of said fixed cutting edge and opposing the edge surface of said fixed cutting edge.

3. An apparatus as set forth in claim 2, wherein said fixed bracket holds said fixed cutting edge and said plate member so that said edge line and said opposing side are spaced at a predetermined interval from each other.

4. An apparatus as set forth in claim 3, further comprising driving means for moving said movable cutting edge in said first and second directions.

5. An apparatus as set forth in claim 4, wherein said driving means includes a motor and cam means, rotated by said motor, for moving said movable cutting edge in said first and second directions.

6. An apparatus as set forth in claim 1, wherein said plate member is colored black so as to enhance said flare preventing function.

7. A sheet-material cutting apparatus for cutting a long photographic sheet-material, being carried in its longitudinal direction, into a plurality of frames, including a cut segment and a remaining portion, said apparatus being provided in the vicinity of an outlet of a photographic printer from which said sheet-material is discharged for cutting by said cutting apparatus, said apparatus comprising:

- a fixed cutting edge;
- a movable cutting edge so spaced away from said fixed cutting edge as to be movable in such a direction as to engage with said fixed cutting edge;
- a driving means for driving said movable cutting edge to cut said sheet-material into said cut segment and said remaining portion of said long photographic sheet-material by engaging said movable cutting edge with said fixed cutting edge, and for separating said movable cutting edge from said fixed cutting edge;
- a movement preventing means, comprising:
  - a plate member for preventing the end portion of said remaining portion of said long photographic sheet-material from moving by a lower horizontal end portion of said plate member in the same direction as the moving direction of said movable cutting edge when said movable cutting edge disengages from said fixed cutting edge; and
  - a fixed bracket cooperating with said fixed cutting edge, said plate member being disposed below said movable cutting edge when said movable cutting edge is at a top dead center of its movement;
- said sheet-material cutting apparatus further comprising a movable mask disposed up-stream from said plate member, cooperating with said plate member in constituting a printing frame defining an image size of each of said plurality of frames to be printed, said printing frame exhibiting a flare preventing function when images are printed on said photographic sheet-material.

8. An apparatus as set forth in claim 7, wherein said fixed plate has an opposing side substantially parallel to an edge line of said fixed cutting edge and opposing said fixed cutting edge.

9. In a photographic printer comprising means for making prints of images from photographic film on strips of photographic paper, and means for conveying said strip from said means for making prints to an outlet of said photographic printer, a cutting apparatus for cutting said strips into a plurality of frames to be printed, said apparatus being disposed between said means for making prints and said outlet, said apparatus comprising:

- a fixed cutting edge;
- a movable cutting edge disposed opposite said fixed cutting edge and moved in a first direction to engage said fixed cutting edge, causing a shearing force by which said strips are cut into a cut segment and a remaining portion, said movable cutting edge being subsequently moved in a second direction opposite to said first direction to disengage from said fixed cutting edge;

a movement preventing means, disposed between said means for making prints and said movable cutting edge, having a plate member, for preventing the end of said remaining portion from moving in said second direction by a lower horizontal end portion of said plate member when said movable cutting edge moved in said second direction;

said cutting apparatus further comprising a movable mask, disposed up-stream from said plate member, cooperating with said plate member in constituting a printing frame defining an image size of each of said plurality of frames to be printed, said printing frame exhibiting a flare preventing function when images are printed on said photographic sheet-material.

10. A sheet-material cutting apparatus for cutting a long photographic sheet-material, being carried in its longitudinal direction, into a plurality of frames to be printed, including a cut segment and a remaining portion, said apparatus being provided in the vicinity of an outlet of a photographic printer from which said sheet-material is discharged for cutting by said cutting apparatus, said apparatus comprising:

a fixed cutting edge;

a movable cutting edge so spaced away from said fixed cutting edge as to be movable in such a direction as to engage with said fixed cutting edge;

a driving means for driving said movable cutting edge to cut said sheet-material into said cut segment and aid remaining portion by engaging said movable cutting edge with said fixed cutting edge, and for separating said movable cutting edge from said fixed cutting edge;

a movement preventing means having a plate member, for preventing the end portion of said remaining portion from moving in the same direction as the moving direction of said movable cutting edge by a lower horizontal end portion of said plate member when said movable cutting edge disengages from said fixed cutting edge;

a movable mask, disposed up-stream from said plate member, cooperating with said plate member in constituting a printing frame defining an image size of each of said plurality of frames to be printed, said printing frame exhibiting a flare preventing function when images are printed on said photographic sheet material; and a fixed bracket for holding said fixed cutting edge and said movement preventing means so as to separate said movable cutting edge and a bottom of said movement preventing means by a predetermined amount, said fixed bracket including U-shaped guide arms having a lower portion to which said fixed cutting edge is secured.

11. In a photographic printer comprising means for making prints of images from photographic film on strips of photographic sheet-material, and a photographic sheet-material cutting apparatus for cutting said strips into a plurality of frames to be printed, said apparatus being disposed between said means for making prints and an outlet of said photographic printer, said apparatus comprising:

a fixed cutting edge;

a movable cutting edge disposed opposite said fixed cutting edge and moved in a first direction to engage said fixed cutting edge, causing a shearing force by which said photographic sheet-material is cut into a cut segment and a remaining portion, said movable cutting edge being subsequently moved in a second direction opposite to said first direction to disengage from said fixed cutting edge;

a movement preventing means, comprising:

a plate member, disposed up-stream of a direction in which said photographic sheet-material is carried with respect to said movable cutting edge, for preventing the end of said remaining portion from moving in said second direction by a lower horizontal end portion of said member when said movable cutting edge moves in said second direction;

a fixed bracket, cooperating with said fixed cutting edge, said plate member being disposed below said movable cutting edge when said movable cutting edge is at a top dead center of its movement;

a movable mask disposed up-stream from said plate member, cooperating with said plate member in constituting a printing frame defining an image size of each of said plurality of frames to be printed, said printing frame exhibiting a flare preventing function when images are printed on said photographic sheet-material; and means for conveying said photographic sheet-material from said means for making prints to said outlet of said photographic printer to feed a first amount of said photographic sheet-material in between said fixed cutting edge and said movable cutting edge after printing an image on said photographic sheet-material in order to cut off a first segment from a first remaining portion, to feed a second amount of said photographic sheet-material in order to cut a printed piece of said photographic sheet-material from a second remaining portion, and to feed a third amount of said photographic sheet-material, said third amount being smaller than said first and second amount, so as to place the photographic printer in a standby condition to print the image on said second remaining portion; and a driving means for driving said movable cutting edge.

* * * * *